US012266888B2

(12) United States Patent
Turner

(10) Patent No.: US 12,266,888 B2
(45) Date of Patent: Apr. 1, 2025

(54) SUBSEA CONNECTOR

(71) Applicant: Siemens Energy Global GmbH & Co. KG, Munich (DE)

(72) Inventor: Kelly Turner, Dalton-In-Furness (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 453 days.

(21) Appl. No.: 17/694,769

(22) Filed: Mar. 15, 2022

(65) Prior Publication Data

US 2022/0302632 A1 Sep. 22, 2022

(30) Foreign Application Priority Data

Mar. 17, 2021 (GB) ...................................... 2103663
Mar. 17, 2021 (GB) ...................................... 2103664
Mar. 17, 2021 (GB) ...................................... 2103666
Mar. 17, 2021 (GB) ...................................... 2103667
Mar. 17, 2021 (GB) ...................................... 2103668
Mar. 17, 2021 (GB) ...................................... 2103669

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01);
(Continued)

(58) Field of Classification Search
CPC .............. H01R 13/523; H01R 13/2421; H01R 13/2471; H01R 13/502; H01R 13/5202; H01R 13/521; H01R 13/5219; H01R 13/5227; H01R 13/533; H01R 13/6271; H01R 13/629; H01R 13/62961;
(Continued)

(56) References Cited

U.S. PATENT DOCUMENTS 3,665,368 A * 5/1972 Ellis .................... H01R 13/523
439/282
3,742,427 A 6/1973 Ballard
(Continued)

FOREIGN PATENT DOCUMENTS

| | | | |
|---|---|---|---|
| FR | 2895577 | A1 | 6/2007 |
| GB | 2338119 | A | 12/1999 |
| WO | 2021037949 | A1 | 3/2021 |

*Primary Examiner* — Justin M Kratt
(74) *Attorney, Agent, or Firm* — Wolter Van Dyke Davis, PLLC

(57) ABSTRACT

A wetmate connector includes a plug and receptacle. The plug includes a plug body and the receptacle includes a receptacle body. The plug includes a recess circumscribing its forward end, adjacent to a coarse alignment feature and rearward of a front surface of the plug body. The coarse alignment feature includes a series of three truncated cones, the first and third of the cones including substantially congruent faces, the first and second cones being joined at their maximum diameter and the second and third cones being joined at their minimum diameter. The receptacle body includes a fastener adapted to cooperate with the recess in the forward end of the plug, to latch the plug and receptacle together when mated.

6 Claims, 6 Drawing Sheets

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/02* | (2006.01) |
| *H01R 13/622* | (2006.01) |
| *H01R 13/6582* | (2011.01) |
| *H01R 13/66* | (2006.01) |

(52) U.S. Cl.
CPC ....... *H01R 13/502* (2013.01); *H01R 13/5202* (2013.01); *H01R 13/521* (2013.01); *H01R 13/5219* (2013.01); *H01R 13/5227* (2013.01); *H01R 13/533* (2013.01); *H01R 13/6271* (2013.01); *H01R 13/629* (2013.01); *H01R 13/62961* (2013.01); *H01R 24/86* (2013.01); *H01R 13/02* (2013.01); *H01R 13/52* (2013.01); *H01R 13/622* (2013.01); *H01R 13/627* (2013.01); *H01R 13/6582* (2013.01); *H01R 13/6675* (2013.01); *H01R 2201/04* (2013.01); *H01R 2201/26* (2013.01)

(58) Field of Classification Search
CPC ........ H01R 24/86; H01R 13/02; H01R 13/52; H01R 13/622; H01R 13/627; H01R 13/6582; H01R 13/6675; H01R 2201/04; H01R 2201/26
See application file for complete search history.

(56) References Cited

U.S. PATENT DOCUMENTS

| | | | | |
|---|---|---|---|---|
| 4,142,770 | A | 3/1979 | Butler, Jr. et al. | |
| 5,670,747 | A | 9/1997 | Lawer | |
| 6,464,405 | B2 | 10/2002 | Cairns et al. | |
| 10,014,678 | B2 | 7/2018 | Barrett et al. | |
| 10,704,353 | B2 | 7/2020 | Painter et al. | |
| 2007/0259568 | A1 | 11/2007 | Mackillop et al. | |
| 2010/0105233 | A1* | 4/2010 | Butaud ................ | H01R 13/523 439/577 |

* cited by examiner

SUBSEA CONNECTOR

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a subsea, or underwater, connector and an associated method.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

An improved wet-mateable connector is desirable.

SUMMARY OF INVENTION

In accordance with a first aspect of the present invention, an ROV wetmateable connector comprises a plug and receptacle, wherein the plug comprises a plug body; and the receptacle comprises a receptacle body; wherein the plug comprises a recess circumscribing its forward end, forming part of a coarse alignment feature and rearward of a front surface of the plug body; the coarse alignment feature comprising a series of three truncated cones, the first and third of the cones comprising substantially congruent faces, the first and second cones being joined at their maximum diameter and the second and third cones being joined at their minimum diameter; wherein the receptacle body comprises a fastener adapted to cooperate with the recess in the forward end of the plug, to latch the plug and receptacle together when mated; and wherein the connector further comprises a plug fine alignment feature comprising a keyway in the plug body; and a receptacle fine alignment feature comprising a key mounted to the receptacle body and adapted to cooperate with the keyway in the plug body to provide fine alignment during mating.

The key may be mounted in an opening in the receptacle body.

The key may be removable from the receptacle body.

The key may comprise a rod, post, or threaded screw.

The opening in the receptacle body may comprise a correspondingly shaped inner surface.

The fastener may comprise a circlip, snap ring, retaining ring, or resilient prongs or collet.

In accordance with a second aspect of the present invention, a method of mating a plug and receptacle of a wet mate connector comprises initiating a mating stroke to engage a front end of the plug in a front end of a receptacle and carrying out coarse alignment by aligning the receptacle with a coarse alignment feature of the plug front end, the coarse alignment feature comprising a series of three truncated cones, the first and third of the cones comprising substantially congruent faces, the first and second cones being joined at their maximum diameter and the second and third cones being joined at their minimum diameter; continuing the mating stroke to carry out fine alignment by engaging a fine alignment key in the receptacle with a fine alignment keyway formed in the plug; and, completing the mating stroke to fasten the plug and receptacle together by activating a latching mechanism in the receptacle rear end to engage with a rear part of the coarse alignment feature.

BRIEF DESCRIPTION OF THE DRAWINGS

An example of a subsea connector and associated method in accordance with the present invention will now be described with reference to the accompanying drawings in which.

DETAILED DESCRIPTION OF INVENTION

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g. CANopen, or level 3, using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary, actuators can be energised, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

Figure 1:
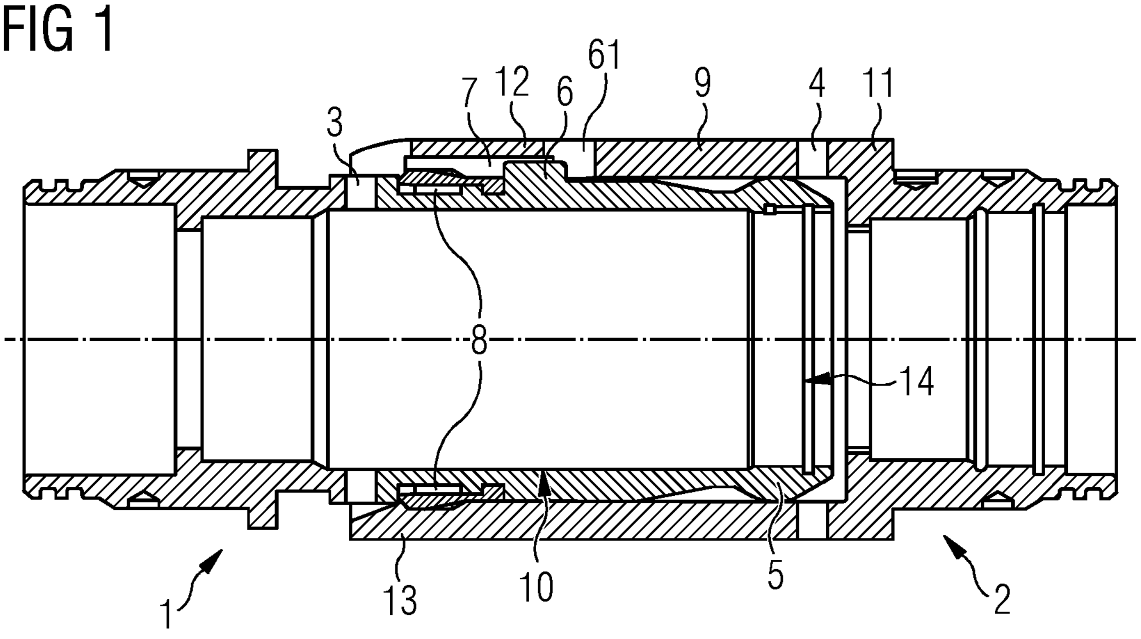
FIG. 1 illustrates an example of a conventional wet-mateable connector.

In a subsea wetmate connector comprising plug 1 and receptacle 2 in which the receptacle part is mounted to already installed equipment or cable, the mating is typically carried out by an ROV or diver, subsea, bringing the plug 1 into contact with the receptacle 2. Conventionally, as illustrated in FIG. 1, a wetmate connector plug 1 was designed with a bullnose end 5 to provide coarse alignment and a key 6 formed in the plug body 10 and protruding from the plug body, cooperated with a keyway 7 undercut in an inner surface of one end 12 of a receptacle body 9 to provide fine alignment. During mating, seawater, together with sand and silt, carried into the receptacle body 9 is forced out, by the movement of the plug body 10 into the receptacle, through ducts 61, 4 in the receptacle body 9. A similar duct is provided in the plug body. Typically, one receptacle duct 61 is provided midway along the receptacle body, in this example, formed as a machining feature of the undercut keyway and one duct 4 toward the innermost or forward end 11 of the receptacle body 9, allow the water/sand/silt to be expelled from the shroud. An ROV capture shroud (not shown) fitted at the foremost point 13 on the receptacle and a plate 14 on the front end of the bullnose plug body 10 prevent metal contact occurring until the plug 1 and receptacle 2 have been successfully aligned in all axes, although these features 13, 14 do not interfere with seawater expulsion during mating. Thereafter, a final step of the mate brings the conductors (not shown) in the plug and receptacle into electrical contact. At this stage, a snap ring 8 on an outward end of the plug, closest to the ROV is engaged to hold the plug and receptacle firmly together and the mate is complete.

However, in a competitive market, there are constant cost pressures. One of the most effective ways to reduce connector cost, is to reduce material cost of each component, in some cases by using different materials, but more generally by reducing size of each component. Subsea connectors have specific compensation and mating requirements, with each element within the connector design having a specific purpose and therefore it can be difficult to reduce the connector length significantly, so in general, the solution has been to reduce wall thicknesses and tighten tolerances to house all required features within a smaller connector body. Using this approach, as individual component design is optimized, there becomes a point where the assembled length can no longer be reduced.

The present invention addresses this problem by taking a new design approach in which features are combined, rather than retaining the conventional serial positioning. As a result, it is possible to reduce the length of the connector significantly and so significantly improve optimization for material cost.

As described with respect to FIG. 1 above, conventional connector designs comprise features to align 5, 6, 7 the connector halves prior to physical contact of the pins during the mating process, as well as a latching mechanism 8, which maintains the physical connection following the mate. Thus, the coarse and fine alignment 5, 6, 7 and the latching 8 are all positioned in series along the receptacle body 9 and plug body 10, whereby the connector parts 1, 2 are first aligned coarsely, then aligned finely, and then in continuing the stroke, the connector parts are latched together.

Figure 2:
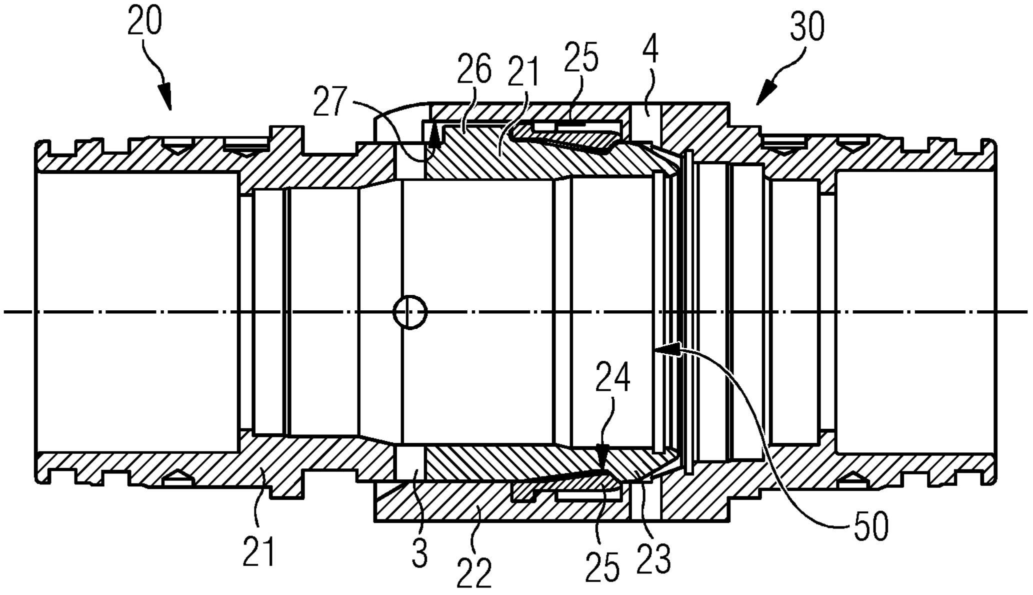
FIG. 2 illustrate a first example of a wet-mateable connector according to the present invention.

FIG. 2 illustrates a first example of the present invention. A plug 20 comprising a plug body 21 and a receptacle 30 comprising a receptacle body 22 of a new design are provided. The plug body 21 comprises front face 50 of a bullnose front end 23 as before, but as can be seen in FIG. 2, instead of the latching or fastening feature being the final element on the plug body, the fastener 25 is now fitted to the receptacle body 22 and makes use of the existing circumferential groove 24 behind the front face 50 of the bullnose plug front end 23 to latch the plug 20 to the receptacle 30. This shortens the overall plug body 21 by combining the location of the fastener 25, for example, a snap ring and the coarse alignment, by using the gap 24 behind the plug front end 23. The exit ducts 3, 4 in the plug and receptacle are still present, although closer to one another, when mated. The mating process, as before, comprises coarse alignment of the plug 20 in the receptacle 30, by an edge of the plug front end that forms the circumferential groove 24 or cutaway behind the front end 23 of the plug 20, followed by fine alignment using a key 26 on the plug body and a keyway 27 in the inner surface of the receptacle body 22. Having aligned the plug in all axes, then the stroke continues to move the plug 20 and receptacle 30 into electrical connection. During this final step, where the ROV brings the plug and receptacle conductors into contact, the fastener 25 moves into latching engagement with the circumferential groove 24 to hold the plug and receptacle together, mated.

The example shown in FIG. 2 is for a circlip, snap ring or other type of retaining ring, mounted to the inner surface of the receptacle body behind the sea water duct at the forward end of the receptacle housing. As the protrusion on the plug front end that forms the front of the circumferential groove 24 moves past the snap ring 25, the snap ring is pushed back into the receptacle body 22, then springs back as the protrusion passes and the fastener sits in the circumferential groove 24, preventing the plug and receptacle from coming apart again after mating. In the example shown, in which the corrosion resistant alloy is one of stainless steel, titanium or super duplex, the receptacle shroud is integrated with the rest of the receptacle and is therefore made of metal. However, if the shroud element were made of plastic or a more compliant metal, then latching features may be formed integral to the shroud. Alternatives to a ring type latch include a collet or resilient prongs arrayed around the shroud or receptacle body. The latch flexes out of the way of the bullnose and then flexes or snaps back into place to latch the plug and receptacle together. To de-mate the plug from the receptacle, the plug is pulled out with sufficient force to overcome the latch. The latching force of the snap ring is sufficiently strong to hold the connectors together despite the force exerted by the shuttle pin springs. The snap ring force is overcome by pulling with enough force to cause the snap ring to flex and open out into the undercut.

By combining the alignment 23, 24 and the latching features 24, 25, so that they are positioned substantially in parallel, the overall length of the plug and receptacle is reduced, and by virtue of this the stroke length is also reduced. The decrease in stroke length impacts other connector components, which may then be shortened further. All of these adjustments culminate in a substantial reduction in overall connector length, and by extension, material cost.

Figure 3:
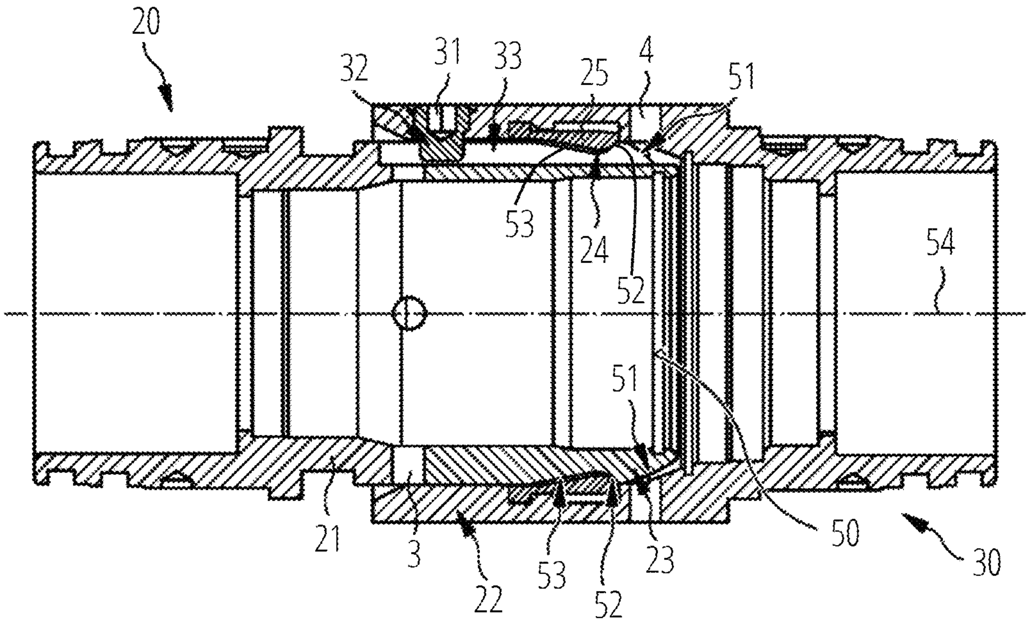
FIG. 3 illustrates a second example of a wet-mateable connector according to the present invention.

FIG. 3 illustrates a further improvement to the invention, whereby the fine alignment 31, 33 is also relocated. Instead of the conventional key on the plug and keyway formed in the receptacle body, FIG. 3 illustrates an improvement in which the keyway 33 is formed in the plug body 21 and the key 31 is provided through an opening 32 in the receptacle body 22. The keyway 33 may be a simple axial groove formed in a short section of the plug body 21 as part of the plug body manufacturing process and the key 31 may be a screw, or rod, inserted through the opening 32 formed in the receptacle housing 22, to hold the plug body in place once mated. The conventional design which required a key to be added onto the plug body was costly, whereas cutting out a keyway 33 in the plug body 21 is a simpler and less expensive step. Similarly, rather than adding a key as a structural part, the new design only requires an opening to be formed in the receptacle body, which can receive a key, in the form of a screw or rod, which is also far simpler and less costly than the existing design. For a screw, the opening would be threaded, for a rod, or post, some other fixing may be provided to keep the rod or post in place.

In the example of FIG. 2, where the fine alignment key is in the plug, there are limits on forward movement before the fine alignment interferes with the coarse alignment. This can be overcome by keying the snap ring and including a slot for the plug's key to pass through. However, this adds complexity, components and cost to the design. In addition, in order that the connector is fully aligned before the shuttle pins become engaged, the depth of the receptacle must be sufficient to ensure that the fine alignment is made before shuttle pins are engaged. These issues are addressed by the design of FIG. 3, which optimises the length of the connector, with the key being in the receptacle, so that course and fine alignment happen as quickly as possible. Thus, the FIG. 3 design has the further benefits of simplification and reduced cost. The mating process is as in FIG. 2, using the bullnose for coarse alignment, the plug keyway and receptacle key for fine alignment, and the circumferential groove and fastener for latching to complete the mate. The latch or fastener sits in the body of the receptacle and clips into the recess of the plug, close to the front of the plug, as the coarse mating surface of the bullnose plug passes and brings the conductors into electrical contact.

The bullnose, in this example, is effectively a pair of back-to-back truncated cones 51, 52 in line with a third truncated cone 53. The largest diameters of the two back-to-back truncated cones are adjacent to one another forming a bullnose surface where conical surfaces 51*a* and 52*a* meet, with a smooth transition across the join and the third truncated cone has its smallest diameter back-to-back with the smallest diameter of the rearward 52 of the pair of cones and has a conical surface 53*a*. The smallest diameter of cone 51 of the pair runs into a plug body section that defines a front surface 50 of the front end of the plug 20 and the smallest diameter of the other cone 52 of the pair defines one side 52*a* of the radial or circumferential groove 24 or recess, in the body 21. Rearward of the groove 24, the diameter expands, along the face 53*a* of the third cone 53 to its maximum diameter. The angle of surface 52*a*, at the rear of the bullnose has been adjusted in line with the snap ring design. The angle must be steep enough so that the snap ring does not deflect, but shallow enough that it deflects when a certain force is applied. In this case, the angle is steep enough to prevent the snap ring deflecting due to the force of the shuttle pin springs, but shallow enough to be demated by an ROV.

Figure 4A:
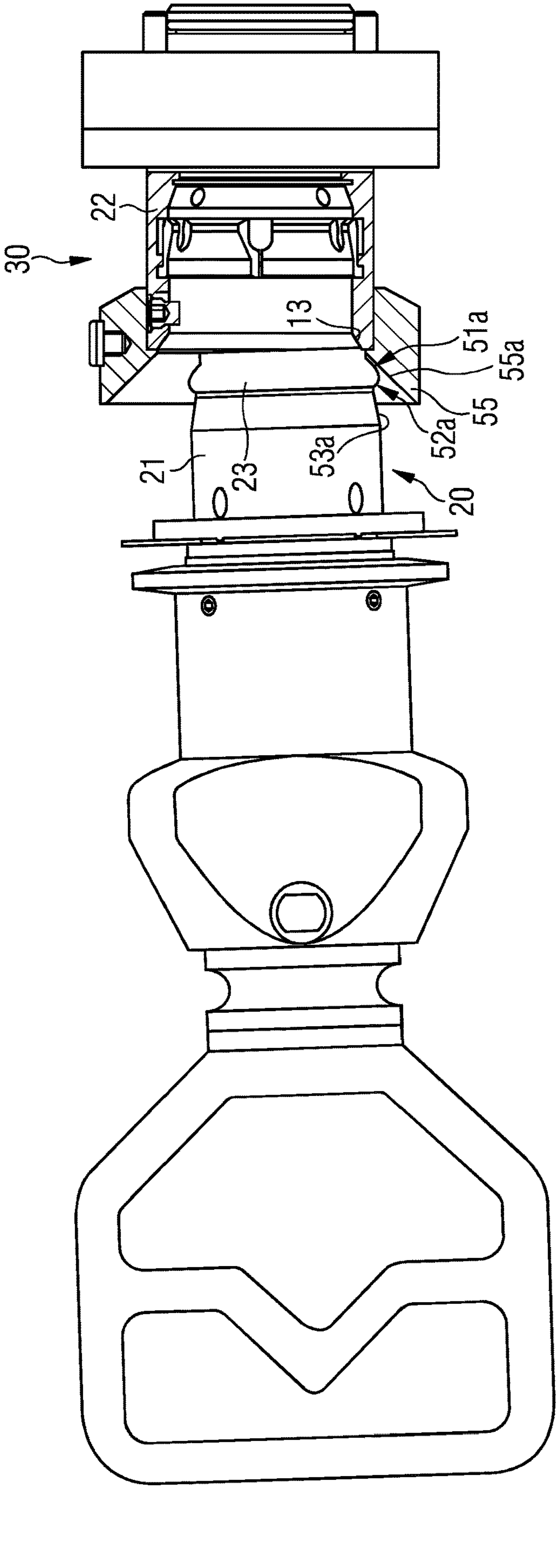
FIGS. 4*a*, 4*b* and 4*c* illustrate the steps of mating a plug and receptacle of a connector according to the present invention.
Figure 4B:
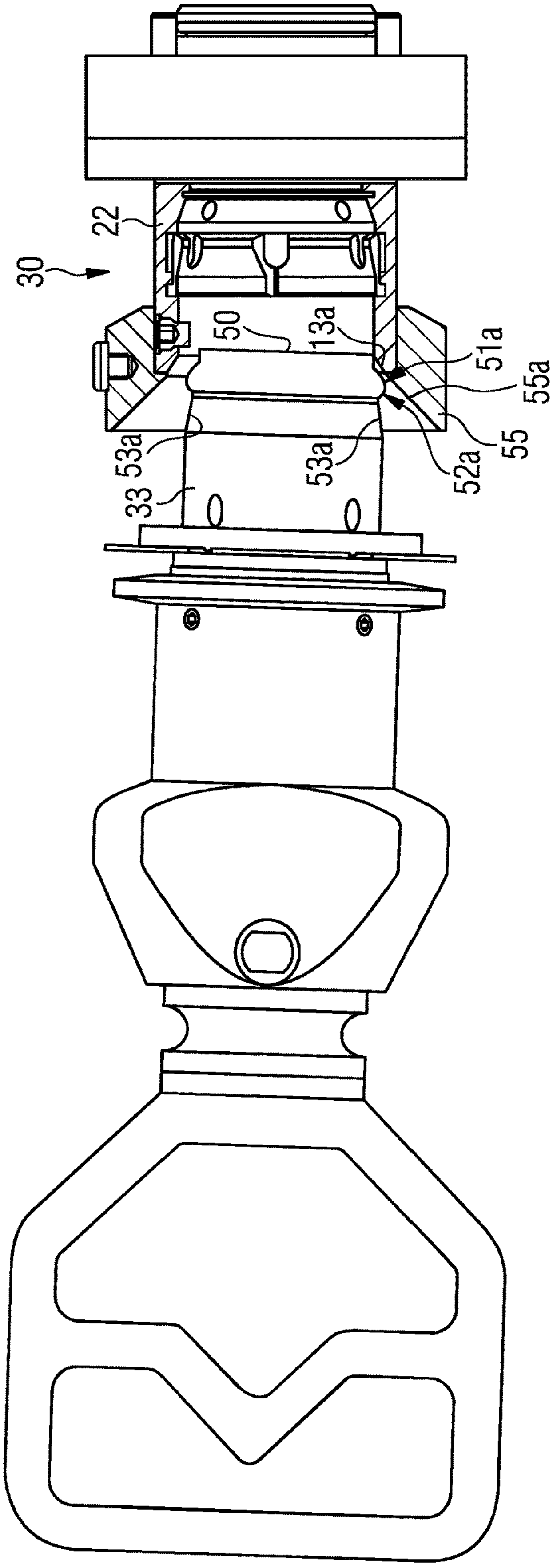
Figure 4C:
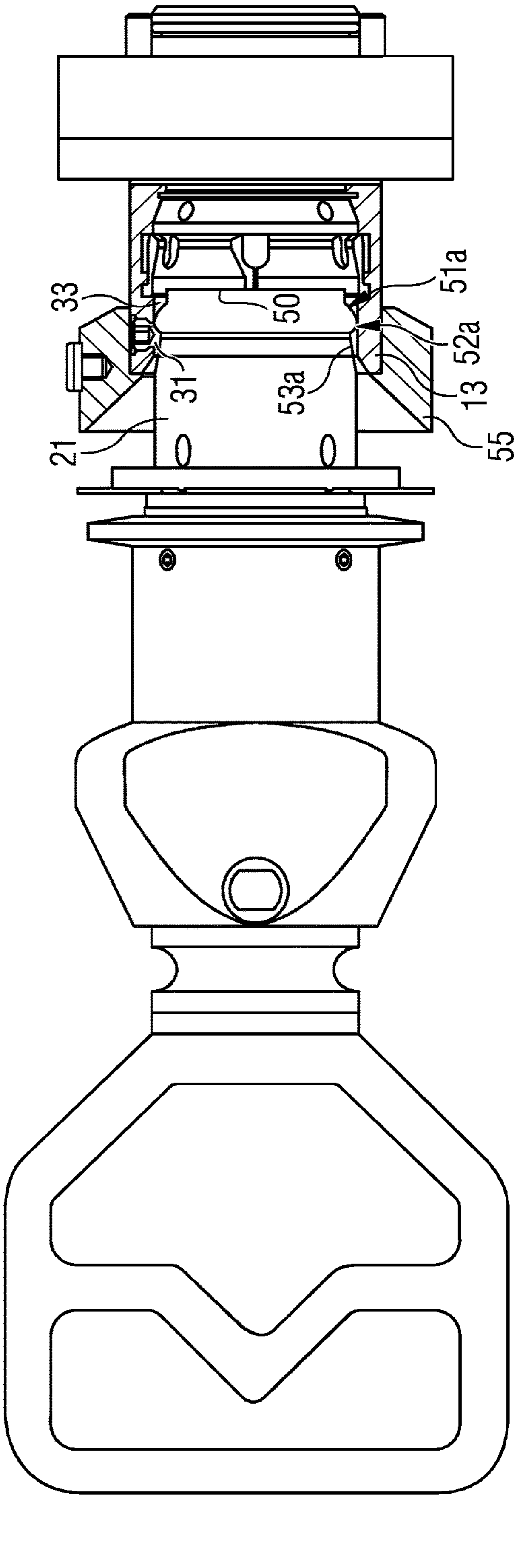

The surfaces, or chamfers, 51*a* and 53*a* may be substantially congruent and lie at an acute angle relative to a central axis 54 of the plug 20, the chamfer's angles relative to the central axis differing by no more than 10 degrees, to enable effective coarse alignment without catching in the entry of the receptacle. Typically, there is a shroud 55, as illustrated in FIGS. 4*a*, 4*b* and 4*c*, fitted to the receptacle 21 to interact with the face 51*a* of the plug, leading the plug in and allowing the plug to be inserted by the ROV arm over a large angle. The recess 24 behind the front cone 51 helps the coarse alignment to be free of catching.

In both the FIG. 2 and FIG. 3 examples, there are several choices of fastener design and material, that may be used and the options described with respect to the example of FIG. 2 may equally be used in the example of FIG. 3.

FIGS. 4*a*, 4*b* and 4*c* illustrate how the coarse alignment of the plug as it first comes into the receptacle for an ROV mate occurs. In a first step, the angled front face 51*a* of the bullnose front end 23 of the plug body 21 enters the shroud 55 that has been fitted to the opening at the foremost point 13 of the receptacle 30. The leading face 51*a* of the bullnose feature engages with an inner surface 55*a* of the shroud 55. The interaction of the two faces 51*a*, 55*a* guides the connector parts towards axial alignment with central axis 54 of the receptacle body 22. As can be seen in FIG. 4*b*, face 51*a* is guided along face 55*a* until it meets inner face 13*a*, at the foremost point of the receptacle body 22. This results in the plug being guided from the shroud 55 into the receptacle body 22. The curved surface between the front two cones 51, 52 also allows the connector to right itself during the mate, as the curved surface acts as a pivot point. FIG. 4*c* illustrates how continuing movement of the plug under control of the ROV brings rear face 53*a* of the bullnose feature into contact with the inner face 13*a*, allowing any mismatch in angle of the plug relative to the receptacle centreline 54 to be corrected prior to engagement of the plug contacts with the receptacle connector pins. Similarly, fine alignment before engagement of the connector pins is assured by the key 31 in the receptacle sliding in the keyway 33 of the plug, ensuring that the rotational alignment of plug and receptacle are correct.

Figure 5:
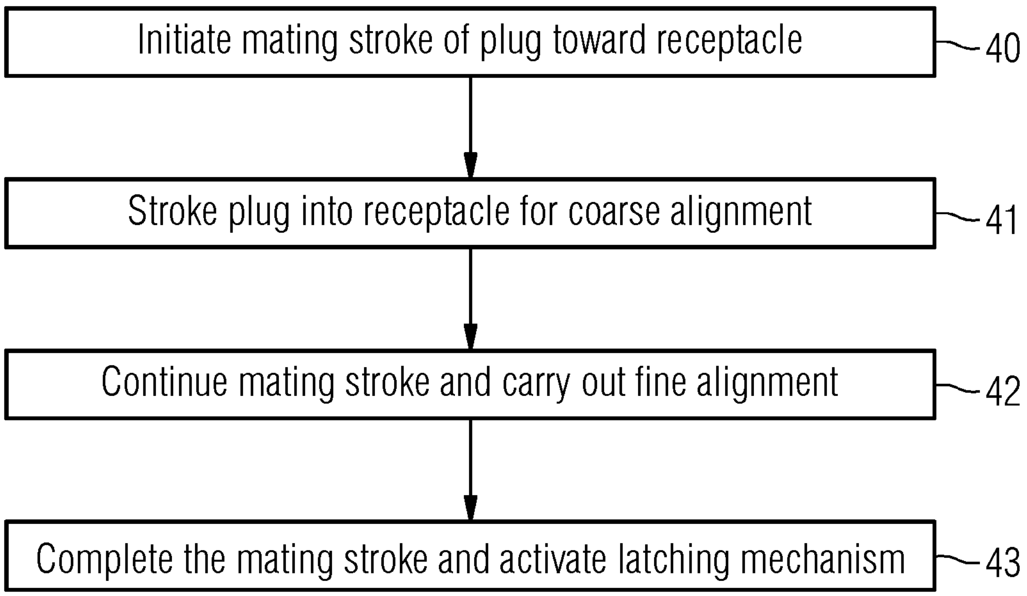
FIG. 5 is a flow diagram illustrating a method of mating connectors, which may be used for the connectors according to the invention.

FIG. 5 illustrates a method of mating a wet mate connector using the plug and receptacle of the present invention. In a first step, a mating stroke is initiated 40 to engage a front end of the plug in a front end of a receptacle and carry out coarse alignment 41 by aligning the receptacle with a coarse alignment feature 23 of the plug front end. The mating stroke continues 42 to carry out fine alignment by engaging a fine alignment key 31 in the receptacle with a fine alignment keyway 33 formed in the plug. The latching mechanism is activated, then as the stroke continues 43 contact is made between the plug and receptacle conductors, then the snap ring snaps into position.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. An ROV (Remotely Operated Vehicle) wetmatable connector, comprising:

a plug including a plug body defining a forward end and an outer surface, the outer surface including:

a first truncated cone having a small diameter end positioned adjacent the forward end and a large diameter end positioned away from the forward end;

a second truncated cone spaced on a side of the first truncated cone away from the forward end, the second truncated cone having a large diameter end positioned on a forward end of the second truncated cone adjacent the first truncated cone and a small diameter end positioned further from the forward end than the large diameter end;

a third truncated cone spaced on a side of the second truncated cone away from the forward end, the third truncated cone having a small diameter end positioned on a forward end of the third truncated cone adjacent the second truncated cone and a large diameter end positioned further from the forward end than the small diameter end, the small diameter end of the second truncated cone and the third truncated cone cooperating to define a recess; and a keyway extending rearwardly from the forward end;

a receptacle including a receptacle body that defines an opening end and an inner surface;

a key coupled to the receptacle body and extending radially inward from the inner surface; and a fastener having a fixed portion connected to the receptacle body and a movable portion that extends inward of the inner surface and is movable into and out of engagement with the recess to connect the plug and the receptacle.

2. The connector according to claim 1, wherein the key is fixedly mounted to the receptacle body.

3. The connector according to claim 1, wherein the receptacle body includes a key aperture, and wherein the key is positioned within the key aperture and is removable from the receptacle body.

4. The connector according to claim 1, wherein the key comprises a threaded screw.

5. The connector according to claim 1, wherein the fastener comprises a circlip or a snap ring.

6. The connector according to claim 1, wherein the fastener comprises a retaining ring, resilient prongs, or a collet.

* * * * *